United States Patent Office 3,270,207
Patented August 30, 1966

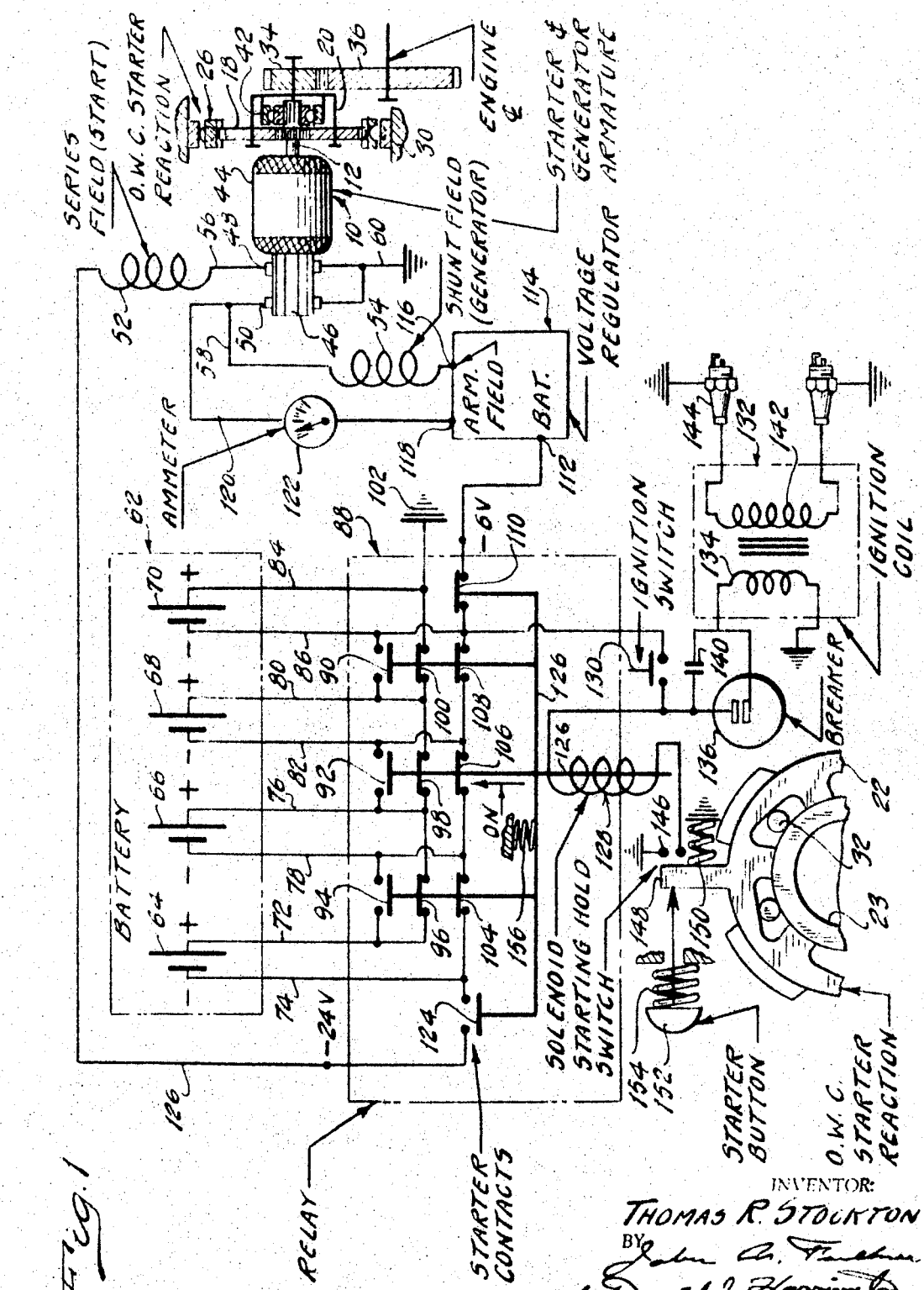

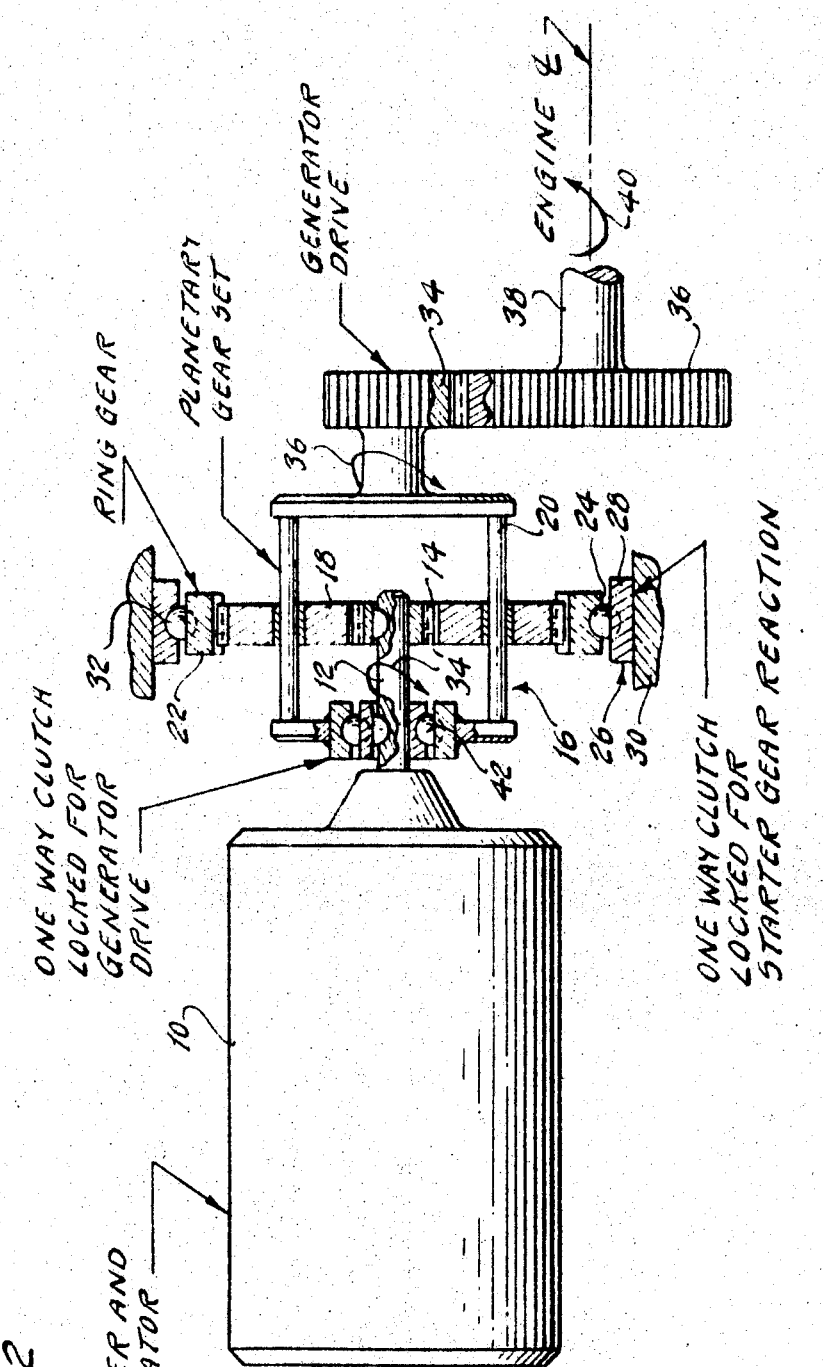

3,270,207
COMBINED ENGINE STARTER AND VOLTAGE GENERATOR SYSTEM
Thomas R. Stockton, Northville, Mich., assignor to The Ford Motor Company, Dearborn, Mich., a corporation of Delaware
Filed June 25, 1964, Ser. No. 377,983
3 Claims. (Cl. 290—31)

My invention relates generally to electrical starter motor and voltage generator systems for internal combustion engines, and more particularly to a combined electrical starter motor and voltage generator unit. My invention is adapted especially for use with an internal combustion engine in an automotive vehicle driveline.

According to a principal feature of my invention, I have provided a combined electric starter motor and generator unit with common armature windings and with two electric fields, one field being series wound to provide a high starter motor torque and the other field being shunt wound to provide optimum current and voltage levels when the unit acts as a generator.

A simplified two-speed gear drive is employed for connecting drivably the armature to the crankshaft of the internal combustion engine during torque delivery from the armature to the crankshaft. The two-speed drive establishes torque multiplication by means of planetary gear elements. When the combined starter-generator unit acts as a generator, however, torque is delivered in the opposite direction from the crankshaft to the armature through the planetary gear elements at a speed ratio of unity. This torque reversal and the change in the effective speed ratio of the drive occurs automatically without the necessity for clutch and brake controls that are sensitive to variables that depend upon engine performance or road load conditions. The provision of a starter motor and voltage generator system of this type is a principal object of my invention.

Electric starter motors commonly used in an environment of this type usually require a high armature current in order to produce the necessary high starter motor output torque for cranking the engine. For this reason metallic type brushes are used with the commutator carried by the armature. Brushes of this type are not feasable, however, for use with the commutator of a generator unit due to their unfavorable wear characteristics. It is common practice to employ instead carbon type brushes in a generator unit to reduce the rate of wear, but such brushes are incapable of accommodating the relatively high amperage that is necessary for the windings of a starter motor armature. It is another object of my invention, therefore, to provide a combined starter and generator unit in an environment of this type wherein a high starter motor output torque may be obtained with a reduced current through the armature windings.

It is a further object of my invention to provide a combined starter motor and voltage generator unit of the type above set forth wherein the operating voltage level during operation as a motor is of an increased magnitude and the operating voltage level during operation as a generator is of a relatively reduced value. I contemplate that this bi-level voltage characteristic and the torque multiplication accomplished by the two-speed drive will make it possible to obtain a satisfactory armature current of reduced magnitude while the engine starting torque is maintained at the required high value.

It is a further object of my invention to provide a switching circuit for the series wound starter motor field and the shunt wound generator field that is capable of effecting an automatic transition in the effective operating voltage upon a torque reversal through the two-speed planetary gear drive.

Further objects and features of my invention will become apparent from the following description and from the accompanying drawings, wherein:

FIGURE 1 shows in schematic form the electrical circuitry for my combined starter motor and generator unit; and FIGURE 2 shows in schematic form the improved two-speed planetary gear drive for my combined starter motor and electrical generator unit.

In FIGURE 2 numeral 10 designates generally a housing that encloses the elements of the combined starter motor and generator. The armature shaft 12, which extends from the housing 10, carries a sun gear 14. This gear forms a part of a two-speed planetary gear unit designated generally by reference character 16. The gear unit includes, in addition to the sun gear 14, a plurality of planet pinions 18 which are rotatably supported upon a carrier 20. The pinions 18 drivably engage also the internal teeth of a ring gear 22. Ring gear 22 is formed integrally with or is connected to the inner race 24 of an overrunning brake 26. Brake 26 includes also an outer race 28 which can be anchored to a stationary housing portion 30. One of the races can be cammed to permit camming action with one-way brake elements 32, which may be in the form of steel balls that engage cooperating cam surfaces of the race.

If the armature shaft 12 is driven in the direction of the arrow 34', the carrier 20 will be driven in the same direction as indicated by the arrow 36. Motion of the ring gear 22 in the opposite direction is inhibited by the brake 26. Freewheeling motion of the ring gear 22 in the direction of the arrows 34' and 36 can be accommodated, however, by the elements 32 and the cooperating cammed race.

A drive pinion 34 is connected drivably to carrier 20. Pinion 34 engages the drive gear 36 that is connected in turn to the vehicle engine crankshaft 38.

When the unit 10 acts as a starter motor, driving torque is delivered to the sun gear 14 and is multiplied by the unit 16 to produce a multiplied pinion driving torque. This torque again is multiplied by the pinion 34 and gear 36 so that the crankshaft is driven in the direction of the arrow 40. As soon as the engine fires the crankshaft 38 becomes the driving member. Engine torque then is delivered from gear 36 through pinion 34 to the carrier 20. Because of this torque reversal, overrunning brake 26 no longer can act as a reaction member. The carrier torque then is delivered directly to the armature shaft 12 through an overrunning clutch 42. This clutch includes overrunning clutch elements, that also may be in the form of balls, and a pair of cooperating outer and inner races. One of these races can be cammed to permit carrier torque to be transferred directly to armature shaft 12 to cause the latter to rotate in the direction of the arrow 34'. It is incapable, however, of delivering torque in the opposite direction from the shaft 12 to the carrier 20. The unit 10 now acts as a generator.

Referring next to FIGURE 1, the unit 10 includes a wound armature 44, a commutator 46, starter motor brushes 48 and voltage generator brushes 50.

Series type starter motor field windings are shown at 52 and shunt wound generator field windings are shown at 54. Windings 52 are connected to brushes 48 through line 56, and windings 54 are connected to brushes 50 through line 58. Both brushes 48 and 50 are connected to ground through a line 60. A battery of 6-volt wet cells is indicated generally by reference character 62. It includes four separate 6-volt cells 64, 66, 68 and 70, each of which has a pair of leads leading to their respective positive and negative terminals. The leads for cell 64 are shown at 72 and 74, the leads for cell 66 are shown at 76 and 78. The leads for cell 68 are shown at 80 and 82 and the leads for cell 70 are shown at 84 and 86. These leads extend to a relay mechanism 88. A relay switch 90, when it is closed, is adapted to connect leads 86 and 80. Corresponding switches 92 and 94 are adapted to establish a connection between leads 82 and 76 and between leads 78 and 72, respectively.

The positive sides of the cells 64, 66, 68 and 70 can be connected together by means of switches 96, 98 and 100. Switch 96 is situated between leads 72 and 76, switch 98 is situated between leads 76 and 80 and switch 100 is situated between leads 80 and 84. Lead 84 is grounded as shown at 102.

All of the negative sides of the cells 64, 66, 68 and 70 can be connected together by means of switches 104, 106 and 108. Switch 104 is situated between leads 74 and 78, switch 106 is situated between leads 78 and 82 and switch 108 is situated between leads 82 and 86. A generator switch 110 is adapted to establish a connection between lead 86 and the battery terminal 112 of a voltage regulator unit 114. The field terminal of voltage regulator unit 114 is connected to the shunt wound generator field windings 54, as indicated at 116. A field terminal 118 is connected to the brushes 50 through an armature lead line 120. An ammeter 122 is situated in the line 120.

The unit 114 functions in a conventional fashion to regulate the voltage level when the unit 10 is acting as a generator.

The relay 88 includes also a starter switch 124 which, when closed, establishes a connection between lead 74 and the field windings 52 through a field lead line 126.

All of the switches in the relay 88 act in unison, and they are connected mechanically to a common solenoid armature member 126. This member 126 forms a part of a solenoid generally identified by reference character 128. One end of the solenoid windings is connected to lead 86 of the battery through an ignition switch 130 which can be opened and closed by the vehicle operator.

Conventional ignition coil windings for the engine ignition system are shown at 132. The primary windings 134 are connected to ground and also to a circuit interrupter in the form of a conventional breaker 136. One side of the breaker is connected to one side of the windings for the solenoid 128. The usual condenser 140 is arranged in parallel with the breaker points.

The secondary windings 142 of the ignition coil 132 are connected to engine spark plugs 144 in a conventional fashion.

The solenoid windings 128 are adapted to be connected to ground through a starting hold-down switch 146. This switch is defined in part by a torque reaction member 148 that is connected directly to the outer race 22 of the overrunning brake 26. Race 22 is biased normally in a counterclockwise direction, as viewed in FIGURE 1, by a spring 150. A starter button 152, which is mechanically connected to the reaction member 148, normally is biased to an inactive position by a spring 154.

During operation, the vehicle operator closes the ignition switch 130 to condition the engine for operation. He then closes starter switch 146 to energize the solenoid windings 128 thereby causing relay armature member 126 to move in an upward direction, as viewed in FIGURE 1, to close switches 94, 92 and 90. At the same time switches 96, 98, 100, 104, 106 and 108 are opened. Also, starter switch 124 is closed and generator switch 110 is opened. It thus is apparent that the switches 94, 92 and 90 will connect the cells of the battery 62 in series with respect to each other and with respect to the starter motor field windings 52. Since leads 84 and the brushes 48 both are grounded, the armature shaft 12 will be driven.

By preference the cells 64, 66, 68 and 70 are six volt cells so that the total voltage made available to the unit 10 is 24 volts. The shaft 12 then cranks the engine in the manner described previously.

As soon as the starter button 152 is pushed, a reaction torque on the race 22 is created. This reaction torque tends to urge the reaction member 128 in a right-hand direction to maintain the switch 146 closed while the engine is cranking. As soon as the engine fires, however, the reaction torque becomes zero and the spring 150 then returns the reaction member 148 to the open circuit position. This interrupts the current in the solenoid circuit and the solenoid armature member 126 is returned to the position shown in FIGURE 1 under the influence of the pressure of the spring 156. This causes switches 94, 92 and 90 to open while the switches 96, 98, 100, 104, 106 and 108 are closed. Also, generator switch 110 is closed and the starter switch 110 is opened. It thus is apparent that the circuit for windings 52 is interrupted while the circuit for the shunt field windings 54 is completed. The cells 64, 66, 68 and 70 thus are connected together in parallel relationship and a parallel circuit for the shunt windings 54 is established.

The total voltage generated by the unit 10 under these conditions is then six volts, assuming that the potential of each cell is six volts.

Having thus described a preferred embodiment of my invention, what I claim and desire to secure by U.S. Letters Patent is:

1. In a combined electric starter motor and voltage generator unit for an internal combustion vehicle engine, a wound armature including an armature shaft, gearing including a reaction element drivably connecting said armature shaft and the crankshaft of said engine to establish a torque delivery path that augments the driving torque of said armature shaft, shunt field windings arranged in parallel relationship with respect to the windings of said armature, series field windings arranged in series relationship with respect to the windings of said armature, a battery having cells with positive and negative terminals, electrical circuitry connecting said battery with each of said windings including multiple switch means adapted to assume either one of two positions, said switch means being adapted to connect said cell terminals in parallel when they assume one position and to connect them in series when they assume the other position, said switch means including also a generator switch adapted to interrupt the circuit for said shunt field when said switches assume said other position and a starter switch adapted to interrupt the circuit for said series field when said switches assume said one position, solenoid actuator means including solenoid windings for actuating said switch means, and a personally operable starter switch adapted to open and close the circuit for said solenoid windings, one side of the latter being connected to one of said cells, said personally operable starter switch including a reaction member connected to the reaction element of said gearing and movable in response to the torque reaction of said gearing during torque delivery from said sun gear to said carrier thereby maintaining said personally operable starter switch closed as long as said torque reaction continues.

2. In a combined electric starter motor and voltage generator unit for an internal combustion vehicle engine, a wound armature including an armature shaft, gearing including a reaction element drivably connecting said armature shaft and the crankshaft of said engine to establish a torque delivery path that augments the driving torque of said armature shaft, shunt field windings arranged in parallel relationship with respect to the windings of said armature, series field windings arranged in series relationship with respect to the windings of said armature, a battery having cells with positive and negative terminals, electrical circuitry connecting said battery with each of said windings including multiple switch means adapted to assume either one of two positions, said switch means being adapted to connect said cell terminals in parallel when they assume one position and to connect them in series when they assume the other position, said switch means including also a generator switch adapted to interrupt the circuit for said shunt field when said switches assume said other position and a starter switch adapted to interrupt the circuit for said series field when said switches assume said one position, solenoid actuator means including solenoid windings for actuating said switch means, a personally operable starter switch adapted to open and close the circuit for said solenoid windings, one side of the latter being connected to one of said cells, said personally operable starter switch including a reaction member connected to the reaction element of said gearing and movable in response to the torque reaction of said gearing during torque delivery from said sun gear to said carrier thereby maintaining said personally operable starter switch closed as long as said torque reaction continues, said gearing comprising a sun gear, a ring gear, planet gears and a carrier rotatably supporting said planet gears, said sun gear being connected to said armature shaft, overrunning brake means for anchoring said ring gear against a stationary member for inhibiting rotation of said ring gear in one direction while accommodating rotation in the opposite direction, said carrier being drivably connected to the crankshaft of said engine, said overrunning brake means accommodating driving torque reaction during torque delivery from said armature shaft through said gearing and overrunning clutch means for drivably connecting said carrier to said armature shaft, said overrunning clutch means being effective to accommodate the delivery of driving torque from said carrier to said armature shaft and being ineffective to deliver torque in the opposite direction.

3. In a combined electric starter motor and voltage generator unit for an internal combustion vehicle engine, a wound armature including an armature shaft, gearing including a reaction element drivably connecting said armature shaft and the crankshaft of said engine to establish a torque delivery path that augments the driving torque of said armature shaft, shunt field windings arranged in parallel relationship with respect to the windings of said armature, series field windings arranged in series relationship with respect to the windings of said armature, a battery having cells with positive and negative terminals, electrical circuitry connecting said battery with each of said windings including multiple switch means adapted to assume either one of two positions, said switch means being adapted to connect said cell terminals in parallel when they assume one position and to connect them in series when they assume the other position, said switch means including also a generator switch adapted to interrupt the circuit for said shunt field when said switches assume said other position and a starter switch adapted to interrupt the circuit for said series field when said switches assume said one position, solenoid actuator means including solenoid windings for actuating said switch means, a personally operable starter switch adapted to open and close the circuit for said solenoid windings, one side of the latter being connected to one of said cells, said personally operable starter switch including a reaction member connected to the reaction element of said gearing and movable in response to the torque reaction of said gearing during torque delivery from said sun gear to said carrier thereby maintaining said personally operable starter switch closed as long as said torque reaction continues, said gearing comprising a sun gear, a carrier, planet gears rotatably mounted upon said carrier and a ring gear, said sun gear being connected to said armature shaft, overrunning brake means for anchoring said ring gear against a stationary member to accommodate driving torque reaction during torque delivery from said sun gear to said carrier and capable of overrunning with respect to said stationary member when said carrier acts as a power input member for said gear unit, said carrier being drivably connected to the crankshaft of said engine, and overrunning clutch means for establishing a one-way driving connection between said carrier and said armature shaft to accommodate torque delivery from said carrier to said armature shaft and to accommodate freewheeling motion of said armature shaft with respect to said carrier when said sun gear acts as a power input element for said gearing.

References Cited by the Examiner

FOREIGN PATENTS 172,274   5/1922   Great Britain.

ORIS L. RADER, *Primary Examiner.*

G. SIMMONS, *Assistant Examiner.*